(12) United States Patent
Zhang (10) Patent No.: US 10,936,271 B2
(45) Date of Patent: Mar. 2, 2021

(54) DISPLAY DEVICE AND THE METHOD THEREOF

(71) Applicant: Lenovo (Beijing) Co., Ltd., Beijing (CN)

(72) Inventor: Jingxin Zhang, Beijing (CN)

(73) Assignee: LENOVO (BEIJING) CO., LTD., Beijing (CN)

( * ) Notice: Subject to any disclaimer, the term of this patent is extended or adjusted under 35 U.S.C. 154(b) by 0 days.

(21) Appl. No.: 16/234,167

(22) Filed: Dec. 27, 2018

(65) Prior Publication Data

US 2019/0205082 A1    Jul. 4, 2019

(30) Foreign Application Priority Data

Jan. 2, 2018   (CN) .......................... 201810003893.3

(51) Int. Cl.

| | |
|---|---|
| *G09G 3/3208* | (2016.01) |
| *G06F 3/14* | (2006.01) |
| *G09G 5/00* | (2006.01) |
| *G06F 3/01* | (2006.01) |
| *H04N 13/30* | (2018.01) |
| *G02B 30/27* | (2020.01) |

(52) U.S. Cl.
CPC ........... *G06F 3/1446* (2013.01); *G02B 30/27* (2020.01); *G06F 3/016* (2013.01); *G09G 5/006* (2013.01); *H04N 13/30* (2018.05); *H04N 2213/006* (2013.01)

(58) Field of Classification Search
CPC ....... G06F 3/1446; G06F 3/016; H04N 13/30; H04N 2213/006; G02B 30/27; G09G 5/006

See application file for complete search history.

(56) References Cited

U.S. PATENT DOCUMENTS

2018/0247568 A1*   8/2018   Wang ..................... G09B 25/06

FOREIGN PATENT DOCUMENTS

| CN | 102469316 A | 5/2012 |
|---|---|---|
| CN | 103207696 A | 7/2013 |
| CN | 103473981 A | 12/2013 |
| CN | 106484158 A | 3/2017 |
| CN | 106782087 A | 5/2017 |
| KR | 0162940 B1 | 1/1999 |

OTHER PUBLICATIONS

Wang, CN 103473981 B machine translation, Sep. 2, 2015 (Year: 2015).*

* cited by examiner

*Primary Examiner* — Peter D McLoone
(74) *Attorney, Agent, or Firm* — Anova Law Group, PLLC (57) ABSTRACT

The present disclosure discloses a display device. The display device includes an interface wherein the interface obtains content to be displayed, and a plurality of display components each having a front display surface to output sub-content. The sub-content is a portion of the content to be displayed. The display device further includes an adjustment assembly. The adjustment assembly moves one or more of the display components in a direction perpendicular to a front display plane.

20 Claims, 6 Drawing Sheets

DISPLAY DEVICE AND THE METHOD THEREOF

CROSS-REFERENCES TO RELATED APPLICATIONS

This application claims the priority to Chinese Patent Application No. 201810003893.3, entitled "A Display Device and the Method Thereof," filed on Jan. 2, 2018, the entire content of which is incorporated herein by reference.

FIELD OF TECHNOLOGY

The present disclosure relates to a display device and a display method.

BACKGROUND

With continued development of science and technology, the pursuit for higher quality of life is also constantly growing. Among them, the real effect of the images presented by television and other display devices is particularly important, and consumers are gradually not satisfied with the traditional planar visual effects. Currently, a user can wear glasses to view processed images, and obtain a more realistic stereoscopic effect. However, the images viewed through the glasses are often blurry, and can only give the user a visual stereoscopic sensation. Such image viewing experiences do not provide the user with tactual stereoscopic sensations, and hence often provide inferior the user experiences.

BRIEF SUMMARY OF THE DISCLOSURE

One aspect of the present disclosure provides a display device. The display device includes an interface wherein the interface obtains content to be displayed, and a plurality of display components each having a front display surface to output sub-content. The sub-content is a portion of the content to be displayed. The display device further includes an adjustment assembly. The adjustment assembly moves one or more of the display components in a direction perpendicular to a front display plane.

Another aspect of the present disclosure provides a display method. The method includes obtaining content to be displayed; adjusting a front display surface of a display component to output sub-content, wherein the sub-content is a portion of the content to be displayed; and adjusting a plurality of the display components in a direction perpendicular to a front display plane to form a front surface elevation difference.

Another aspect of the present disclosure provides a display device. The device includes an interface wherein the interface obtains content to be displayed; elevation data corresponding to the obtained content; a plurality of display components each having a front display surface to output sub-content, wherein the sub-content is a portion of the content to be displayed; and an adjustment assembly wherein the adjustment assembly moves one or more of the display components in a direction perpendicular to a front display plane according to the elevation data.

BRIEF DESCRIPTION OF THE DRAWINGS

For a more complete understanding of the present disclosure, and the advantages thereof, reference is now made to the following descriptions to be taken in conjunction with the accompanying drawings.

DETAILED DESCRIPTION

Hereinafter, aspects, features, and embodiments of the present disclosure will be described with reference to the accompanying drawings. It should be understood that such description is exemplary only but is not intended to limit the scope of the present disclosure. In addition, it will be understood by those skilled in the art that various modifications in form and details may be made therein without departing from the spirit and scope of the present disclosure.

The terms used herein is for the purpose of describing particular embodiments only but is not intended to limit the present disclosure. The words "a", "an" and "the" as used herein should also cover the meanings of "a plurality of" and "a variety of", unless the context clearly dictates otherwise. In addition, the terms "comprising", "including", "containing" and the like as used herein indicate the presence of the features, steps, operations and/or components, but do not preclude the presence or addition of one or more other features, steps, operations or components.

All terms (including technical and scientific terms) used herein have the same meanings as commonly understood by the skilled in the art, unless defined otherwise. It should be noted that the terms used herein should be construed to have the same meanings as the context of the present specification and should not be interpreted in an idealized or overly stereotyped manner.

When describing an embodiment using the language of "at least one of A, B and C, etc.", it should be interpreted in accordance with the meaning of the expressions commonly understood by those skilled in the art (e.g., "a system having at least one of A, B and C" shall include but not limit to a system having A alone, B alone, C alone, A and B, A and C, B and C, and/or A, B and C, etc.). When describing an embodiment using the language of "at least one of A, B or C, etc.", it should be interpreted in accordance with the meaning of the expressions commonly understood by those skilled in the art (e.g., "a system having at least one of A, B and C" shall include but not limit to a system having A alone, B alone, C alone, A and B, A and C, B and C, and/or A, B and C, etc.). It should also be understood by those skilled in the art that essentially two or more optional items in transitional conjunctions and/or phrases in the description, claims, or accompanied drawings should be understood to include the possibility of one of these items, any one of these items, or both items. For example, the phrase "A or B" will be understood to include the possibility of "A" or "B" or "A and B".

Some block diagrams and/or flowcharts are shown in the accompanying drawings. It should be understood that some blocks or combinations thereof in the block diagrams and/or flowcharts may be implemented by computer program instructions. The computer program instructions may be provided to a general purpose computer, a dedicated computer, or processors of other programmable data processing devices, so that the instructions, when being executed by the processor, may create means for implementing the functions/operations as described in the block diagrams and/or flowcharts.

Thus, the technologies of the present disclosure may be implemented in forms of hardware and/or software (including firmware, microcode, etc.). In addition, the technologies of the present disclosure may be embodied in a form of a computer program product on a computer readable medium storing instructions. The computer program product may be used by an instruction execution system or in conjunction with an instruction execution system. In the context of the present disclosure, the computer readable medium may be any medium capable of containing, storing, transmitting, propagating, or transmitting instructions. For example, the computer readable media may include, but are not limited to, electrical, magnetic, optical, electromagnetic, infrared or semiconductor systems, apparatuses, devices, or propagation media. Particular examples of the computer readable media may include a magnetic storage device, such as a magnetic tape or a hard drive disk (HDD); an optical storage device, such as an optical disk (CD-ROM); a memory, such as a random access memory (RAM) or a flash memory; and/or a wired/wireless communication link.

One aspect of the present disclosure provides a display device having an interface to obtain content to be displayed; a plurality of display components each having a front display surface to output a sub-content, which is a portion of the content to be displayed; and an adjustment assembly to move one or more of the display components in a direction perpendicular to the front display plane to form a front surface elevation difference.

As disclosed above, the display device provided by the embodiments of the present disclosure can distribute the content to be displayed to a plurality of display components. Each display component can move independently, and a plurality of adjacent display components can form the shape of stairs at different elevation levels, so the images presented on the display device may achieve a concave-convex effect. As such, embodiments of the present disclosure may visually make the displayed images more layered, and give the user a visual stereoscopic sensation along with a tactual stereoscopic sensation.

Figure 1:
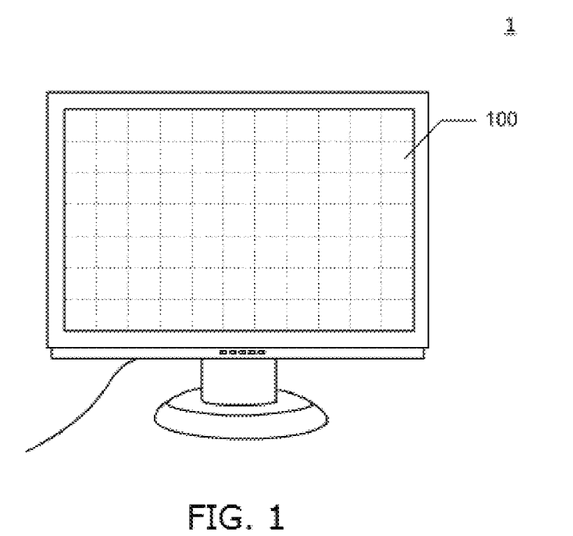
FIG. 1 illustrates a use case of a display device according to an embodiment of the present disclosure.

FIG. 1 illustrates a use case of a display device according to an embodiment of the present disclosure. It should be noted that FIG. 1 is only an example of a display device to which the embodiments of the present disclosure may be applied. FIG. 1 is provided to help those skilled in the art understand the technical content of the present disclosure, but it does not mean that the embodiments of the present disclosure may not be used on other devices, systems, environments, or scenarios.

As shown in FIG. 1, the display device 100 according to an embodiment of the present disclosure can be applied to a computer display 1. The computer display 1 may receive information such as video images or pictures and displays them using the screen of the computer display. The display device 100 according to an embodiment of the present disclosure can move a plurality of display regions on the screen of the computer display 1 to protrude from the screen's reference surface when displaying videos or images to present a visual and tactual stereoscopic sensation.

It should be understood that the use scenario in FIG. 1 is only an example. The display device 100 can be applied not only to a computer display, but to other devices having a display such as computer tablets, mobile phones, all-in-one computers, display screens, gaming consoles, etc.

Figure 2:
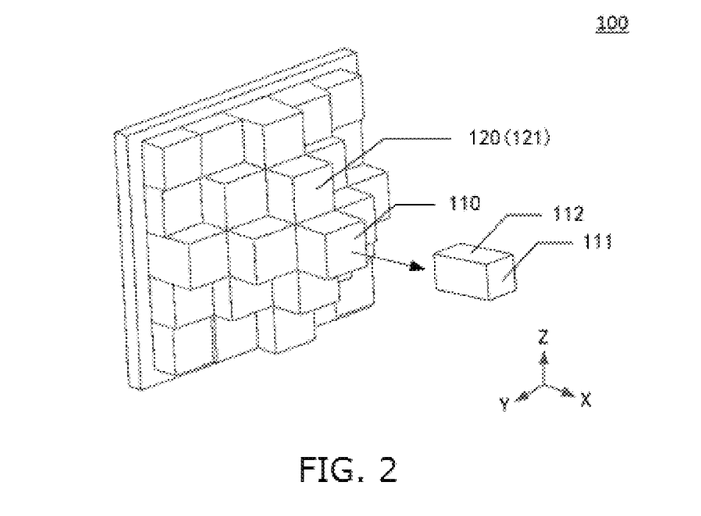
FIG. 2 illustrates a structural diagram of a display device according to an embodiment of the present disclosure.

FIG. 2 illustrates a structural diagram of a display device according to an embodiment of the present disclosure.

As shown in FIG. 2, a display device 100 having an interface (not shown) to obtain content to be displayed; a plurality of display components each having a front display surface to output a sub-content, which is a portion of the content to be displayed; and an adjustment assembly to move at least one of the display components in a direction perpendicular to the front display plane to form a front surface elevation difference.

The interface can be a software or a hardware component for receiving data, such as a data cable connection interface, a network cable connection interface, or a wireless network connection interface. The interface can be a component consists of a combination of software and hardware components. For example, for displays, the interface can be the connection interface to a video card to receive data from the video card (this can include devices such as mobile phones, notebooks, smart televisions' built-in data connection interface, and an external data connection interface between a desktop and a display); or for all-in-one computers, the interface module can be the network cable connection interface to receive network data through a cable; or for tablets, the interface module can be the wireless network card to receive network data wirelessly.

Display device 100 may include a plurality of arrays of display components. Display device 100 may further include a first display component 110 having a first front display surface 111 to output a first sub-content; a second display component 120 adjacent to the first display component having a second display front display surface 121 to output a second sub-content. The first and second sub-contents may be adjacent portions of the contents to be displayed.

The content to be displayed may be video data, and the sub-content can be the sub-image of every image in the video data evenly distributed to the plurality of display components. Further, the content to be displayed may be image data, and the sub-content can be the sub-image of an image evenly distributed to the plurality of display components.

The front display surface 111 may be the front viewing surface or the front display plane of the first display component 110, which refers to the front display plane watched by a viewer in front of the display device. As shown in FIG. 2, when the front display surface is flat, it can be referred to as the front display plane. The front display plane is parallel to the Y-Z plane, the direction perpendicular to the front display plane is the X direction, and every display component can move back and forth in the X direction, adjacent display components can form a front surface elevation difference along the X direction. When two front display surfaces (e.g., 111 and 121) form the shape of stairs, the front surface elevation difference is the coordinate difference of the front display surfaces of two adjacent display components in the X direction. When the front display surface is not flat (e.g., FIG. 2), the front display plane refers to the projection of the front display surface onto the Y-Z plane. Furthermore, when the peripheral region of the front display surface is bendable, the center region may be the flat region located in a plane parallel to the Y-Z plane as shown in FIG. 2. The direction perpendicular to the front display plane refers to the direction perpendicular to the center region of the front display surface, and the front surface elevation difference is the coordinate difference of the center region of the front display surfaces of two adjacent display components in the X direction.

The method in which the adjustment assembly adjust the display components may include the steps of: adjust the first display component 110 to rise, that is, moving in the +X direction; retract the first display component 110, that is, moving in the −X direction; adjust the first display component 110 to rise (protruding) and retract its adjacent second display 120 module; adjust first and second display components to rise, but to different elevations; or retract first and second display components to different elevations.

Figure 3:
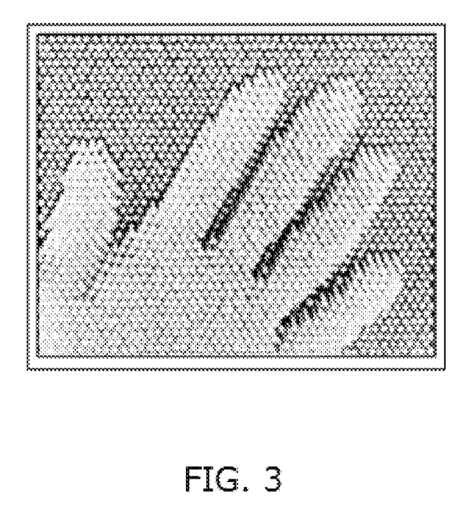
FIG. 3 illustrates a perspective rendering of a display device according to an embodiment of the present disclosure.

The number of interface units may be less than the number of display components, and the content to be displayed can be received through an interface unit and distributed to each display component for display. The number of display components may be M×N, wherein M≥2 and/or N≥2. FIG. 3 illustrates a perspective rendering of a display device according to an embodiment of the present disclosure. As shown in FIG. 3, the larger the value of M and N, the more the number of display components, the finer the sub-content of each display component outputs, the better the stereoscopic effect of the display device, when each display component moves independently. The maximum of M×N can be the maximum resolution of the display device, that is, the front display surface of each display component may contain only one pixel display unit.

As disclosed above, the display device provided by the embodiments of the present disclosure can present images on the display device with a concave-convex effect, which not only visually makes the displayed images more layered, but also gives the user a visual stereoscopic sensation along with a tactual stereoscopic sensation.

According to one embodiment of the present disclosure, each display component has side display surfaces. When adjacent display components form the front surface elevation difference, the side display surfaces corresponding to the front surface elevation difference can display the sub-content such that the display device can display the display content at least in a direction parallel to the front display surface.

More specifically, the first display component 110 may have a first side display surface 112. When the first display component 110 and the second display component 120 form the front surface elevation difference, a portion of the first display side surface 112 corresponding to the side of the front surface elevation difference may be exposed in the viewing direction parallel to the front display surface of the user's field of view, and the first display side surface 112 may output the sub-content.

The side display surface may be connected to the edge of the front display surface at an angle. The front display surface can be circular, quadrilateral or triangular, etc., correspondingly, the side display surface can be the side surface of the cylinder, cuboid, triangular prism, etc.

The display device may output an image only on the front display surface, or both the front display surface and the side display surface, or a portion of the front display surface. The sub-content on the side display surface may be the same or different from the sub-content on the front display surface.

As disclosed above, the side display surface of the display device may also output an image, which not only allows the user to view the image from the side of the display device, but also makes the connection effect between the front display surfaces of each display component better.

According to one embodiment of the present disclosure, the display components include one or more front display surface units to display the corresponding sub-content by outputting sub-content display lights on the front display surface. Further, the content lights outputted on the side display surfaces match at least a portion of the one or more front display surface units corresponding to the edge of the front display surface unit of the front surface elevation difference.

Figure 4A:
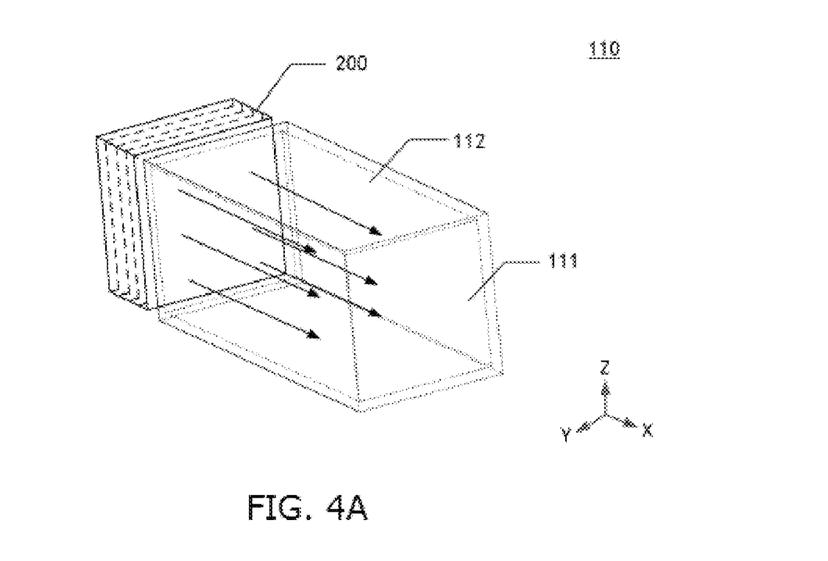
FIG. 4A illustrates a structural diagram of a display component having a front display surface according to an embodiment of the present disclosure.
Figure 4B:
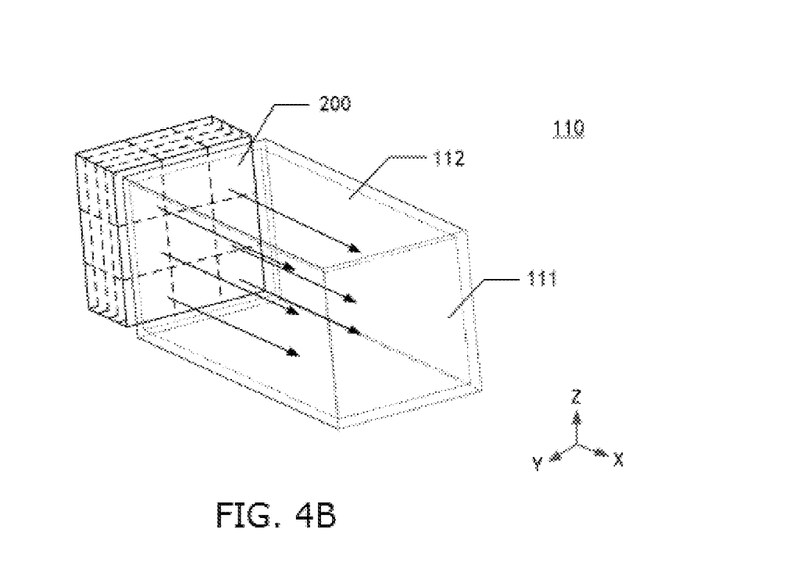
FIG. 4B illustrates a structural diagram of a display component having a plurality of front display surfaces in according to an embodiment of the present disclosure.

FIG. 4A illustrates a structural diagram of a display component having a front display surface according to an embodiment of the present disclosure, and FIG. 4B illustrates a structural diagram of a display component having a plurality of front display surfaces in according to an embodiment of the present disclosure.

As shown in FIG. 4A and FIG. 4B, the first front display surface 111 and the first side display surface 112 may both be made of transparent materials (i.e., materials whose light transmittance exceed certain thresholds, e.g., 50% or 90%). One end of the first side display surface 112 may connect to the first front display surface 111, the other end connects to one or multiple first front display surface units 200, that is, the first front display surface unit may not be located at the front display surface, but behind the complete display surface (front display surface and side display surface). FIG. 4A shows a case of one first front display surface unit 200 which may include one or more pixel display units. FIG. 4B, shows a case of multiple first front display surface unit 200, in which every first front display surface unit may include one or more pixel display units. The first front display surface unit 200 may further include a plurality of layers of material, such as backlight layers, liquid crystal layers, color filters, polarizers, and the like such that the first front display surface unit is a liquid crystal panel. Of course, the front display surface unit may also be a display unit of other display principles, such as an OLED.

The first front display surface unit 200 corresponds to the sub-content of the first display front surface 111. The first front display surface unit 200 outputs the sub-content lights to the first front display surface 111 according to the image parameters such as the color values of the sub-content, so the sub-content is displayed on the first front display surface.

The content lights outputted by the first side display surface 112 may correspond to at least a portion of one or multiple first front display surface units 200 located at the edge of the corresponding front surface elevation difference may be understood as follows.

When there is only one first front display surface unit 200, the content lights outputted by the first side display surface 112 may correspond to content lights outputted by the first front display surface unit 200. More specifically, the term "corresponds to" may be understood as the content lights outputted by the first side display surface 112 corresponds to the content lights outputted by certain pixel display units located on the edge of the front surface elevation difference side of the first front display surface unit For example, in the case where the first display component 110 includes only one first front display surface unit 200, the first front display surface unit 200 may include, for example, a 5×5 pixel display unit, if the first display component 110 forms a front surface different with the display component to its right, then the content lights outputted by the right side of the first side display surface 112 can be the lights outputted by the 5 pixels located at the far right of the front surface display unit.

When there is a plurality of first front display surface units 200, the content lights outputted by the first side display surface 112 corresponds to content lights outputted by certain the front display units 200 located at the edge of the front surface elevation difference side. For example, if the first display component 110 forms a front surface different with the display component to its right, then the content lights outputted by the right side of the first side display surface 112 can be all the lights outputted by the pixels located in the far right row of all the first front surface display units 200.

If the light transmittance of the first side display surface 112 is relatively high, other than the lights outputted by the pixels in the far right row, the lights outputted by the relatively inner pixels may transmit through as well.

Figure 5:
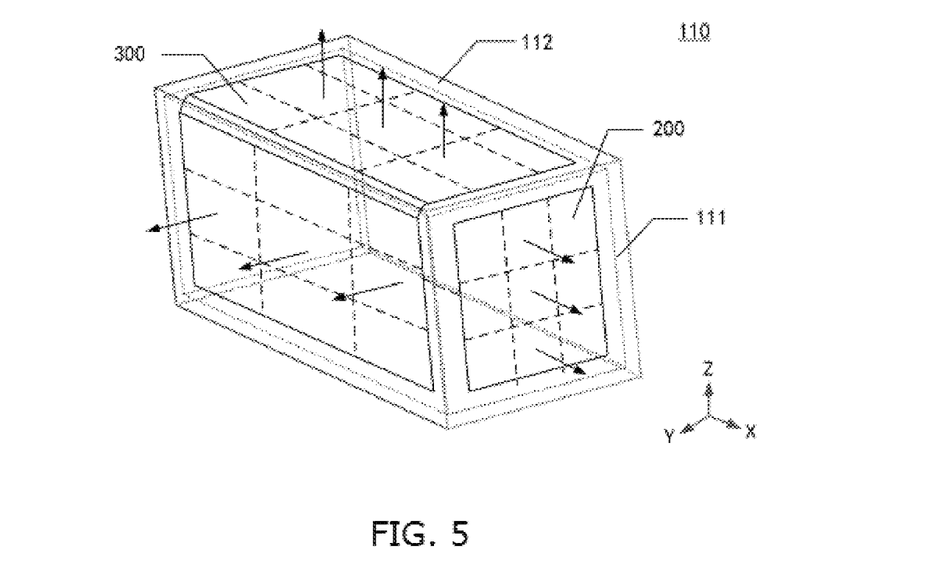
FIG. 5 illustrates a structural diagram of a display component having a front display surface and a side display surface according to an embodiment of the present disclosure.

FIG. 5 illustrates a structural diagram of a display component having a front display surface and a side display surface according to an embodiment of the present disclosure.

As shown in FIG. 5, according to one embodiment of the present disclosure, the display component may include one or more front display surface units 200 to output sub-content display lights on the front display surface, and one or more side display surface units 300 to output sub-content display lights on the side display surface.

Corresponding to the first front display surface 111, one or more first front display surface units 200 may be disposed, and the first front display surface units 200 are disposed at the first front display surface 111. Corresponding to the first side display surface 112, one or more first side display surface units 300 may be disposed, and the first side display surface units 300 are disposed at the first side display surface 112. The first front display surface units 200 and the first side display surface units 300 may both include one or more pixel display units. When a first side display surface unit 300 is provided, if the side surface is a cylindrical surface, then the first side display surface unit 300 may cover 360° of the area of the cylindrical surface. If the side surfaces are the surfaces of a quadrangular prism, then the first side display surface unit 300 can be folded into four parts, each part covering one side of the quadrangular prism surface. Of course, in addition to the above case of only one first side display surface unit 300, each side of the quadrangular prism surface may also be provided with one or more first side display surface units 300. The case where the first side display surfaces 112 are the surfaces of a triangular prism is similar to the case where the side surfaces are the surfaces of a quadrangular prism. The first front display surface 111 and the first side display surface 112 may output mutually independent images.

As disclosed above, the side display surfaces can output independent images to allow users view different images from different angles of the display device, so the users are not limited to the front side of the display device and the stereoscopic effect will be more realistic.

According to one embodiment of the present disclosure, the interface module obtains content to be displayed on the front display surface and content to be displayed on one or more side display surfaces, and the display component outputs the sub-content of the content to be displayed on the front display surface through the front display surface and the sub-content of the content to be displayed on the side display surfaces through the side display surfaces.

The content to be displayed on the front display surface correspond to the front display surface of the display component, and the contents to be displayed on the front display surface can be an image. The interface unit may obtain the image and distributes it to a plurality of display components where each display component corresponds to a portion of the image. Each display component may receive its portion of the image, use the front surface display unit to convert it into lights, and output the lights to the front display surface.

The content to be displayed on one or more side display surfaces may correspond to the entire displayable side display surface of the display components, and the content to be displayed on the side display surfaces may be an image. Taking the sides of a quadrangular prism as an example, the side image may contain image information of four sides, the interface module obtains the side image and distributes it to a plurality of side display surfaces of the display components according to the number of position of the side display surfaces on each side of the display device, every side display surface receives a corresponding sub-image and converts it into lights using the side display surface unit, and outputs the lights to the side display surface.

For example, when the image displayed on the display device includes a mountain, the content to be displayed on the front display surface may be the image of the mountain top captured from above the top of the mountain, that is, a top view of the mountain. The content to be displayed on the side display surfaces may be images composed of pictures captured from the east, south, west, and north side of the mountain. The content to be displayed on the front display surface may be distributed to the front display surfaces of each display component if the front display surface of one of the display components outputs the image of the mountain top.

Figure 6:
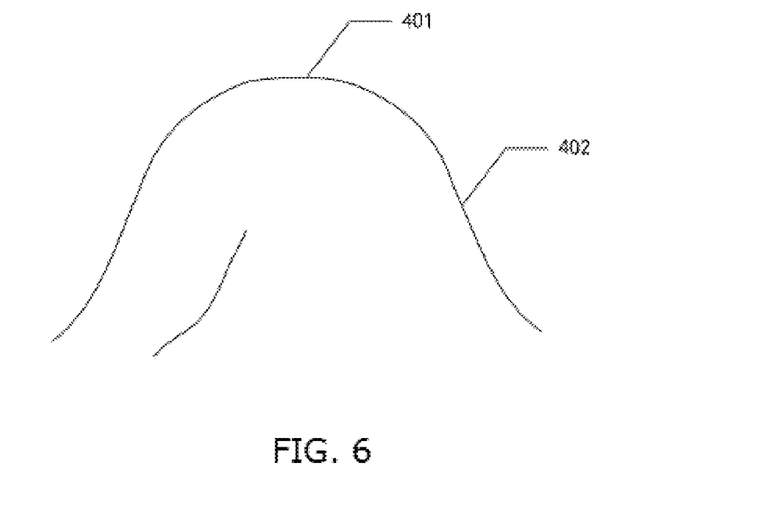
FIG. 6 illustrates a mountain top image according to an embodiment of the present disclosure.

FIG. 6 illustrates a mountain top image according to an embodiment of the present disclosure. In FIG. 6, the top surface 401 of the mountain top area may be white, and the four sides 402 may be green, red, yellow, and black, respectively (colors not shown). If the display component forms a front surface elevation difference with all of its four adjacent display components, that is, the four sides of the display component are all displayable, then the front display surface of the display component outputs the top image of the mountain top area, that is, in white, the four side display surfaces of the display component output the four side images of the mountain top area, that is, in green, red, yellow, and black, respectively.

According to one embodiment of the present disclosure, the side display surfaces or a portion of the side display surfaces blocked by the adjacent display components may not output the sub-content when adjacent display components do not form the front surface elevation difference. A portion of the side display surfaces blocked by the adjacent display components may not output the sub-content when adjacent display components form the front surface elevation difference, the unblocked portions of the side display surfaces may output the sub-content. The elevation range of the first display component 110 and its adjacent display components in the direction perpendicular to the front display plane (in the X direction as shown in FIG. 2), that is, their coordinates in the X direction, may be used to determine a displayable region and a blocked region of the first display component 110. When the side display surface 112 of the first display component 110 is able to display in separate regions, the side display surface unit corresponding to the displayable region can output the sub-content lights, so the sub-content is outputted to the displayable region, and the side display surface unit corresponding to the blocked region can be turned off so the sub-content is not outputted to the block region.

For example, when the first display component 110 and its adjacent second display component 120 do not form a front surface elevation difference, the opposite side of the side display surfaces of the first display component 110 may be turned off. When the first display component 110 and its adjacent second display component 120 forms a front surface elevation difference, the range of the front surface elevation difference can be used to determine the displayable region and the blocked region of the opposite side of the side display surfaces of the first display component 110 where the blocked region is turned off and the displayable region displays.

When the side display surfaces of the display components can be controlled to display independently, the exposed portion can be controlled to display according to the area exposed on the side display surface, thereby saving power consumption.

According to one embodiment of the present disclosure, the front display surface of the display components may have a center region and a peripheral region; the front surface elevation difference is a distance between the center regions of the adjacent front display faces that are parallel to each other. The center region and the peripheral region may be on or approximately on the same plane when adjacent display components do not form the front surface elevation difference. Further, at least a portion of the peripheral region corresponding to the front surface elevation difference may form a transition when adjacent display components form the front surface elevation difference.

The pressure between the adjacent display components may support the peripheral region and the center region on or approximately on the same plane when adjacent display components do not form the front surface elevation difference. The peripheral region of the relatively protruding display component sags relative to the center region due to gravity when adjacent display components form the front surface elevation difference. Further, the display components may have a deformable structure that can be used to adjust the peripheral region (retract or protrude) relative to the center region of the relatively retracting display component or the fall of the peripheral region relative to the center region of the relatively protruding display component when adjacent display components form the front surface elevation difference.

Figure 7:
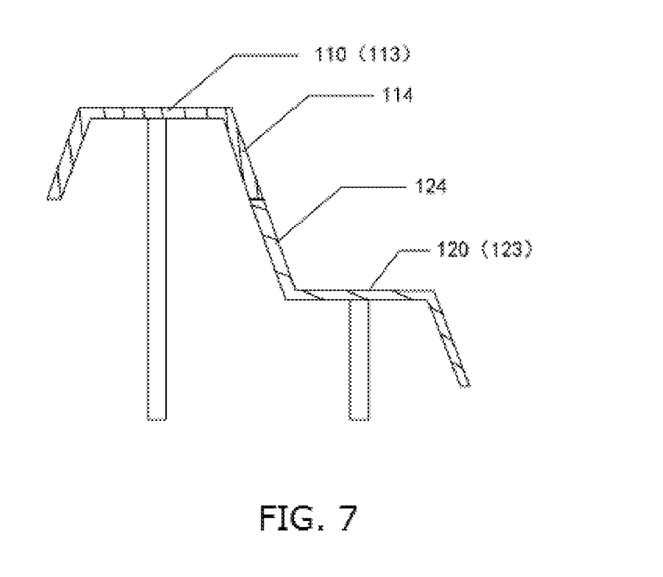
FIG. 7 illustrates a cross-sectional view of a display component in another structural design in a first state according to an embodiment of the present disclosure.
Figure 8:
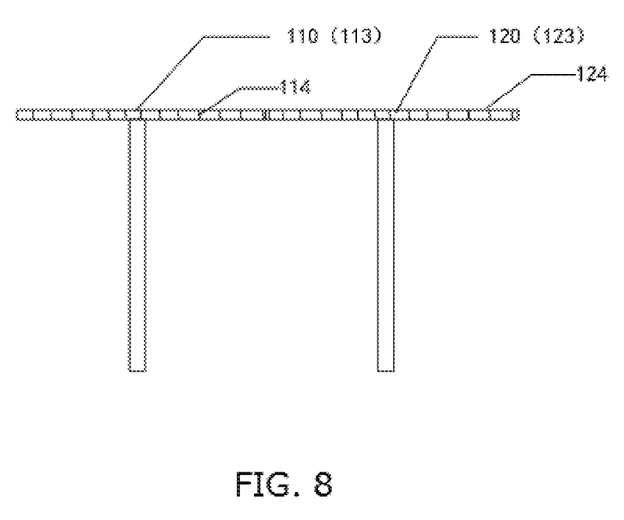
FIG. 8 illustrates a cross-sectional view of a display component in another structural design in a second state according to an embodiment of the present disclosure.

FIG. 7 illustrates a cross-sectional view of a display component in another structural design in a first state according to an embodiment of the present disclosure and FIG. 8 illustrates a cross-sectional view of a display component in another structural design in a second state according to an embodiment of the present disclosure.

As shown in FIG. 7 and FIG. 8, the front display surface of the first display component 110 has a center region 113 and a peripheral region 114, the front display surface of the second display component 120 has a center region 123 and a peripheral region 124, and the front surface elevation difference between two display components is the distance between center region 113 and center region 123. When the first display component 110 and the second display component 120 do not form the front surface elevation difference, there is pressure between the two front surfaces to hold the peripheral region 114 and the center region 113 on or approximately on the same plane; when the first display component 110 and the second display component 120 form the front surface elevation difference, at least a portion of the peripheral region corresponding to the front surface elevation difference forms a transition, and the peripheral region of the relatively protruding first display component 110 droops relative to the center region due to gravity. As shown in FIG. 7, the first display component 110 and the second display component 120 may have a deformable structure to control the rise of the peripheral region 124 relative to the center region 123 of the relatively retracting second display component 120 and the fall of the peripheral region 114 relative to the center region 113 of the relatively protruding first display component 110 when adjacent display components form the front surface elevation difference.

The center region 113 and the peripheral region 114 of the front display surface may be two independent screens, or the front display surface may be a flexible screen. The deformable structure may be a support assembly and a bending assembly. The support assembly may support the center region of the front display surface in a flat state, and bending assembly may trigger the peripheral region to bend on one side when the adjacent display components form a front surface elevation difference. When peripheral region 114 rises or falls relative to the center region 113, it corresponds to the side display surface of the abovementioned display component.

According to one embodiment of the present disclosure, the adjustment assembly may include a plurality of adjustment subassembly arrays and each adjustment subassembly array corresponds to one display component. The display components may include one or more front display surface units; and the interface module obtains an elevation data of the display components and transmits the elevation data to the adjustment assembly. The display device may further include a processing unit to analyze the contents to be displayed, obtain the elevation data of the display components, and transmit the elevation data to the adjustment assembly. The elevation data indicates how far a display component should protrude or retract from the front display plane or front display surface.

The content to be displayed on the front display surface obtained by the interface may contain a plurality of color data and elevation data corresponding to each color data. The display may evenly distribute the color data and the corresponding elevation data to the display components when the number of display components is less than the number of color data. The elevation of the display components may be the average of multiple assigned elevation data. For example, the contents to be displayed on the front display surface may contain a plurality of front surface image pixels. The information of each front surface image pixel may include a color value and an elevation data. When the number of front surface image pixels is greater than the number of display components, the front surface image pixels may be evenly distributed to the front display surfaces of the plurality of display components, and the elevation of the display components may be the average of the elevation data of the plurality of front display surface image pixels assigned to the display components.

The contents to be displayed on the side display surfaces may contain a plurality of pieces of color data. The interface unit can also evenly distribute the color data of the contents to be displayed on the side display surfaces to the side display surface units that can output the sub-content when the number of pieces of color data of the contents to be displayed on the side display surfaces is greater than the number of side display surface units that can output the sub-content. For example, the content to be displayed on the side display surfaces can contain a plurality of side surface image pixels, and the information of each side surface image pixel includes a color value. When the number of side surface image pixels is greater than the number of display components, the side surface image pixels are evenly distributed to the side display surfaces of the plurality of display components.

If the data obtained by the interface unit does not contain elevation data, then the display device needs to analyze the contents to be displayed to identify the elevation of each display component. The display components may include a processing unit to analyze the contents to be displayed, obtain the elevation data of the plurality of display components, and transmit the elevation data to the adjustment assembly.

The analyze process may be as follow: the processing units include a plurality of image templates, such as landscape templates, character templates, building templates, etc., where each image template includes one or more types of objects, and information such as the protruding elevation of each part of each object. After the processing units obtain the image to be displayed, an image recognition algorithm can be used to identify the objects in the image, find similar objects in the image templates, and use the elevation data in the image templates to determine the elevations of the display components used to display the objects.

Each adjustment subassembly in the adjustment assembly may include a driving mechanism for driving the corresponding display component to advance or retreat in a direction perpendicular to the front display plane according to the elevation data of each display component.

The driving mechanism may include a motor, a gear and an adjusting rod. The motor drives the gear to rotate, the gear drives the adjusting rod connected to the gear to move back and forth, and the front end of the adjusting rod is connected to the display component, and the rotating direction of the rotating time of each motor may be adjusted, thereby adjusting the elevation of each display component, for example, the gear and the adjusting rod can be a worm wheel and a worm.

A plurality of display components may also share a motor, for example, each display component in a row of display components may have a gear and an adjusting rod, and the rotation of the motor drives all the gears in the row to rotate. Each display component also needs a limiting device. When the adjusting rod pushes the display component to the specified position, the limiting device may lift the gear to make it idle, so the gear no longer moves the adjusting rod and the display component no longer moves. The driving mechanism may further comprise a cavity filled with gas or liquid, and the display component may be driven up and down by multi-cavity inflation/filling. For example, after the inflation/filling amount is increased, the volume expansion of the cavity may push the display component up.

The driving mechanism may further comprise an electromagnet, wherein the current difference in electromagnet can generate a suction/repulsive force to drive the lifting and lowering of the display component. For example, after a current passes through the electromagnet, a suction force is generated with the magnetic component of the display component, thereby lowering the display component; after a reverse current passes through the electromagnet, a repulsive force is generated with the magnetic component of the display component, thereby raising the display component.

Figure 9:
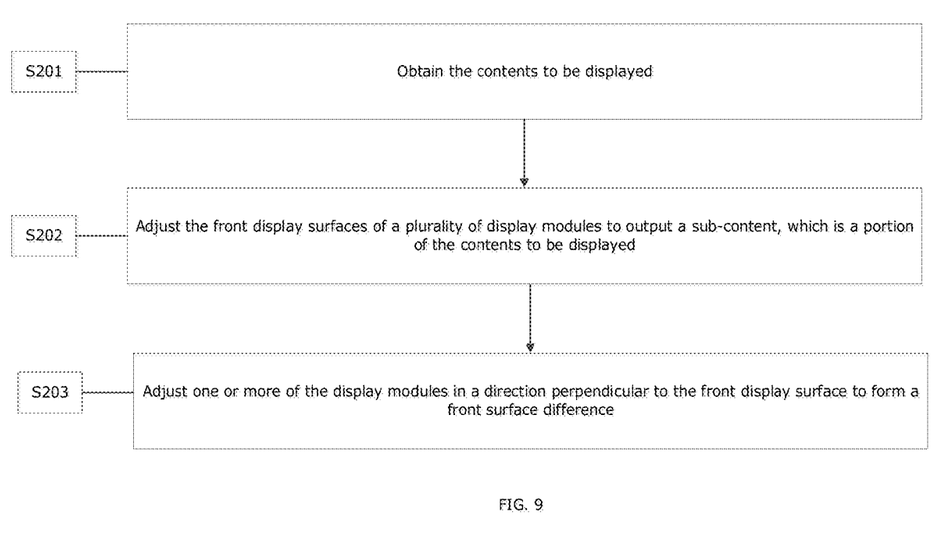
FIG. 9 illustrates a flowchart of a data processing method according to an embodiment of the present disclosure.

Another aspect of the present disclosure further provides a display method, which can be used in the display device disclosed above. FIG. 9 illustrates a flowchart of a data processing method according to an embodiment of the present disclosure. As shown in FIG. 9, the display method according to an embodiment of the present disclosure includes steps S201 to S203.

Step S201, obtain contents to be displayed.

Step S202, adjust a front display surface of a plurality of display components to output a sub-content, which is a portion of the contents to be displayed.

Step S203, adjust one or more of the display components in a direction perpendicular to the front display plane to form a front surface elevation difference.

Figure 10:
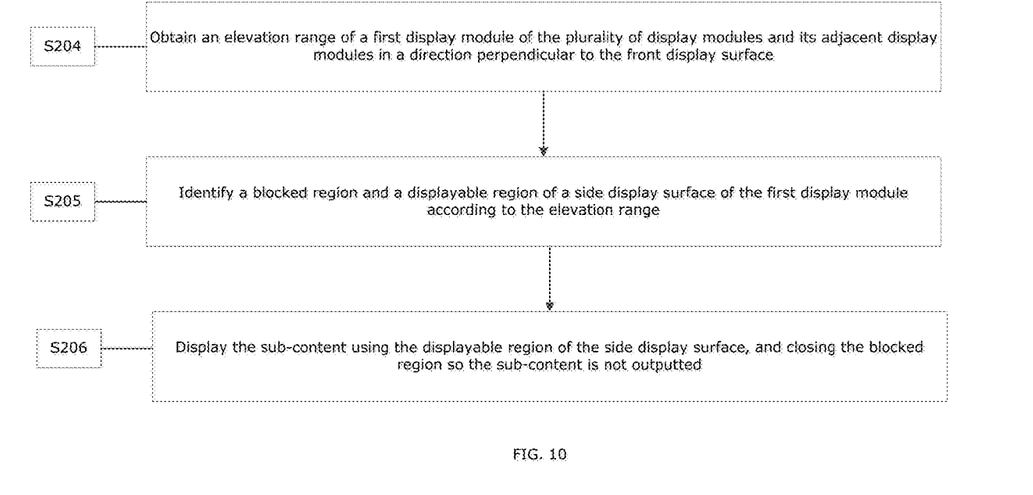
FIG. 10 illustrates another flowchart of a data processing method according to an embodiment of the present disclosure.

FIG. 10 illustrates another flowchart of a data processing method according to an embodiment of the present disclosure. As shown in FIG. 10, according to an embodiment of the present disclosure, the method further includes steps S204 to S206.

Step S204, obtain an elevation range of a first display component of the plurality of display components and its adjacent display components in a direction perpendicular to the front display plane.

Step S205, identify a blocked region and a displayable region of a side display surface of the first display component according to the elevation range.

Step S206, display the sub-content using the displayable region of the side display surface, and closing the blocked region so the sub-content is not outputted.

According to an embodiment of the present disclosure, the method may further include the steps of: obtaining an elevation data of the display components and move the display components according to the elevation data; or analyzing the contents to be displayed content to determine the elevation data of the display components and adjust the display components according to the elevation data.

When the contents to be displayed include elevation data, the elevation of each display component is determined according to the elevation in the contents to be displayed. More specifically, the contents to be displayed may include contents to be displayed on the front display surface and contents to be displayed on the side display surface. When the contents to be displayed on the front display surface contains a plurality of color data and elevation data corresponding to each color data, the color data and the corresponding elevation data may be evenly distributed to the display components when the number of display components is fewer than the number of pieces of color data, and the elevation of the display components is the average of multiple assigned elevation values. For example, the contents to be displayed on the front display surface may contain a plurality of front surface image pixels, and the information of each front surface image pixel includes a color value and an elevation data. When the number of front surface image pixels is greater than the number of display components, the front surface image pixels may be evenly distributed to the front display surfaces of the plurality of display components, and the elevation of the display components is the average of the elevation data value of the plurality of front display surface image pixels assigned to the display components. When the contents to be displayed on the side display surfaces contain a plurality pieces of color data, if the number of color data matches the number of side display surface units that can output the sub-content, the system may evenly distribute the plurality of color data of the contents to be displayed on the side display surfaces to the side display surface units that can output the sub-content when the number of color data of the contents to be displayed on the side display surfaces is greater than the number of side display surface units that can output the sub-content. For example, the contents to be displayed on the side display surfaces can contain a plurality of side surface image pixels, and the information of each side surface image pixel may include a color value. When the number of side surface image pixels is greater than the number of display components, the side surface image pixels are evenly distributed to the side display surfaces of the plurality of display components.

If the contents obtained do not contain elevation data, then the content to be displayed needs to be analyzed to determine the elevation of each display component. The process of analyzing the contents to be displayed may include the steps of: after obtaining the image to be displayed, using an image recognition algorithm to identify objects in the image, obtaining the features of the objects and their positions in the image, using the features of the objects to find similar objects in image templates, and using the elevation data in the image templates to determine the elevations of the display components used to display the objects. The image templates can be landscape templates, character templates, building templates, etc., and each image template includes one or more types of objects, and information such as the protruding elevation of each part of each object. After the elevations of the objects are determined, identify the plurality of display components used to output the image of the objects in the display device, and then control the elevations of the display components corresponding to the elevation of to the elevations of each part of the objects. For details, refer to FIG. 2 to FIG. 8 and the foregoing descriptions of the corresponding drawings, and details are not described herein again.

While the present disclosure has been shown and described with reference to various embodiments thereof, it will be understood by those skilled in the art that various modifications in form and details may be made therein without departing from the spirit and scope of the present disclosure as defined by the appended claims and their equivalents. Therefore, the scope of the present disclosure should not be limited to the above-described embodiments but should be determined by not only the appended claims but also the equivalents thereof.

What is claimed is:

1. A display device, comprising:
an interface wherein the interface obtains content to be displayed, the content to be displayed including videos and images;
a plurality of display components configured to output sub-content, wherein:
the sub-content is a portion of the content to be displayed; and
each display component has a front display surface configured to output front part sub-content and side display surfaces configured to output side part sub-content, the front part sub-content being a part or all of a first image, the side part sub-content being a part or all of a second image, the first image being different and independent from the second image; and
an adjustment assembly wherein the adjustment assembly moves one or more of the display components in a direction perpendicular to a front display plane.

2. The display device according to claim 1, wherein:
in response to adjacent display components forming a front surface elevation difference, a side display surfaces corresponding to the front surface elevation difference displays the sub-content, the display device displaying the display content on a surface parallel to the front display plane.

3. The display device according to claim 2, wherein the display components include one or more front display surface units displaying the corresponding sub-content by outputting sub-content display lights on the front display surfaces, the content lights outputted on the side display surfaces matching a portion of one or more front display surface units corresponding to an edge of the front display surface unit, the edge of the front display surface unit forming the front surface elevation difference.

4. The display device according to claim 2, wherein the display component comprising:
one or more front display surface units to output sub-content display lights on the front display surfaces; and
one or more side display surface units to output sub-content display lights on the side display surfaces.

5. The display device according to claim 4, wherein:
the interface obtains the content to be displayed on the front display surfaces and content to be displayed on one or more side display surfaces; and
the display component outputs the content to be displayed on the front display surface and on the side display surfaces.

6. The display device according to claim 4, wherein:
the side display surfaces or a portion of the side display surfaces blocked by the adjacent display components do not display the sub-content when adjacent display components form a flat front surface; and
one or more portions of the side display surfaces blocked by the adjacent display components do not display the sub-content when adjacent display components form the front surface elevation difference, one or more unblocked portions of the side display surfaces display the sub-content.

7. The display device according to claim 1, wherein:
a front display surface of a display component includes a center region and a peripheral region;
the front surface elevation difference is a distance between the center regions of adjacent front display surfaces that are parallel to each other;
the center region and the peripheral region are on the same plane when adjacent display components do not form the front surface elevation difference;
a portion of the peripheral region forms a transition when adjacent display components form the front surface elevation difference; and
wherein a pressure between the adjacent display components supports the peripheral region and the center region on the same plane when adjacent display components form a flat front surface, the peripheral region of the protruding display component droops relative to the center region in response to adjacent display components form the front surface elevation difference.

8. The display device according to claim 1, wherein:
a front display surface of a display component includes a center region and a peripheral region;
the front surface elevation difference is a distance between the center regions of adjacent front display surfaces that are parallel to each other;

the center region and the peripheral region are on the same plane when adjacent display components do not form the front surface elevation difference;

a portion of the peripheral region forms a transition when adjacent display components form the front surface elevation difference; and wherein the peripheral region of the display components has a deformable structure that can rise relative to the center region of the relatively retracted display component and fall relative to the center region of the protruding display component in response to adjacent display components form the front surface elevation difference.

9. The display device of claim 1, wherein:

the adjustment assembly includes a plurality of adjustment subassembly arrays and each adjustment subassembly array corresponds to one display component;

the display components include one or more front display surface units;

wherein the interface obtains an elevation data of the display components and transmits the elevation data to the adjustment assembly; and the display device further includes a processing unit to analyze the content to be displayed, obtain the elevation data for the display components, and transmit the elevation data to the adjustment assembly.

10. A display method, comprising:

obtaining content to be displayed;

adjusting a front display surface of a display component to output sub-content, wherein:

the sub-content is a portion of the content to be displayed;

the front display surface is configured to output front part sub-content and;

the display component further comprises side display surfaces configured to output side part sub-content, the front part sub-content being a part or all of a first image, the side part sub-content being a part or all of a second image, the first image being different and independent from the second image; and adjusting a plurality of the display components in a direction perpendicular to a front display plane to form a front surface elevation difference.

11. The display method of claim 10, further comprising:

obtaining an elevation range of a first display component of the plurality of display components and its adjacent display components in a direction perpendicular to the front display plane;

identifying a blocked region and a displayable region of a side display surface of the first display component according to the elevation range; and displaying the sub-content using the displayable region of the side display surface.

12. The display method of claim 11, further comprising:

analyzing the content to be displayed to determine the elevation data of the display components and adjusting the display components according to the elevation data.

13. The display method of claim 10, further comprising:

obtaining an elevation data of the display components and adjust the display components according to the elevation data.

14. A display device, comprising:

an interface wherein the interface obtains content to be displayed;

elevation data stored in the display device corresponding to the obtained content;

a plurality of display components each having a front display surface to output front part sub-content and side display surfaces configured to output side part sub-content, wherein:

the sub-content is a portion of the content to be displayed; and the front part sub-content is a part or all of a first image, the side part sub-content is a part or all of a second image, the first image being different and independent from the second image; and an adjustment assembly wherein the adjustment assembly moves one or more of the display components in a direction perpendicular to a front display plane according to the elevation data.

15. The display device according to claim 14, wherein:

each display component has side display surfaces;

in response to adjacent display components forming a front surface elevation difference corresponding to the elevation data, the side display surfaces corresponding to the front surface elevation difference display the sub-content, the display device displaying the content in a direction parallel to the front display plane.

16. The display device according to claim 15, wherein each of the display components include one or more front display surface units, the display units displaying the corresponding sub-content by outputting sub-content display lights on the front display surfaces, the content lights outputted on the side display surfaces matching a portion of one or more front display surface units corresponding to an edge of the front display surface unit, the edge of the front display surface unit forming the front surface elevation difference.

17. The display device according to claim 15, wherein the display component comprising:

one or more front display surface units to output sub-content display lights on the front display surfaces; and one or more side display surface units to output sub-content display lights on the side display surfaces.

18. The display device according to claim 15, wherein:

the interface obtains content to be displayed on the front display surfaces and content to be displayed on one or more side display surfaces; and the display component displays the content on the front display surface and on the side display surfaces.

19. The display device according to claim 15, wherein:

the side display surfaces or a portion of the side display surfaces blocked by the adjacent display components do not display the sub-content when adjacent display components form a flat front surface; and one or more portions of the side display surfaces blocked by the adjacent display components do not display the sub-content when adjacent display components form the front surface elevation difference corresponding to the elevation data, one or more unblocked portions of the side display surfaces display the sub-content.

20. The display device according to claim 15, wherein:

a front display surface of a display component includes a center region and a peripheral region;

the front surface elevation difference is a distance between the center regions of adjacent front display surfaces that are parallel to each other;

the center region and the peripheral region are on the same plane when adjacent display components do not form the front surface elevation difference; and a portion of the peripheral region forms a transition when adjacent display components form the front surface elevation difference.

* * * * *